United States Patent [19]

Grypczynski et al.

[11] Patent Number: 5,086,201

[45] Date of Patent: Feb. 4, 1992

[54] METHOD AND DEVICES FOR THE EXTRACTION OF A CLOSURE PLUG FROM A STEAM GENERATOR TUBE

[75] Inventors: Daniel Grypczynski, Lyons; Paul Jacquier, Tassin la Demi-Lune; André Guglielmo, Villeurbanne, all of France

[73] Assignee: Framatome, Courbevoie, France

[21] Appl. No.: 503,701

[22] Filed: Apr. 3, 1990

[30] Foreign Application Priority Data

Apr. 4, 1989 [FR] France ................... 89 04418

[51] Int. Cl.$^5$ ................. B23H 1/00; B23H 7/26; B23H 9/00
[52] U.S. Cl. ................. 219/69.17; 219/69.2
[58] Field of Search ........... 219/69.1, 69.11, 69.17, 219/69.2; 376/260; 29/723, 726, 727, 402.06, 402.07, 426.4, 426.5

[56] References Cited

U.S. PATENT DOCUMENTS

| | | | |
|---|---|---|---|
| 2,942,092 | 6/1960 | Cammann | 219/69.2 |
| 4,366,617 | 1/1983 | Nanstiel et al. | 29/727 |
| 4,476,368 | 10/1984 | Cammann et al. | 219/69.2 |
| 4,555,833 | 12/1985 | Hawkins et al. | 29/726 |
| 4,694,677 | 9/1987 | Rabe | 29/727 |
| 4,696,102 | 9/1987 | Overbay | 29/726 |
| 4,734,972 | 4/1988 | Hawkins | 29/726 |
| 4,793,056 | 12/1988 | Kurokawa et al. | 29/726 |
| 4,800,637 | 1/1989 | Overbay | 29/426.4 |
| 4,804,814 | 2/1989 | Southerland et al. | 219/69.2 |
| 4,829,660 | 5/1989 | Everett et al. | 29/727 |
| 4,903,392 | 2/1990 | Stickel et al. | 29/426.5 |
| 4,916,282 | 4/1990 | Chamming et al. | 219/69.2 |
| 4,948,933 | 8/1990 | Thompson | 219/69.2 |

FOREIGN PATENT DOCUMENTS

| | | |
|---|---|---|
| 0292183 | 11/1988 | European Pat. Off. . |
| 3447870 | 12/1984 | Fed. Rep. of Germany . |
| 263865 | 11/1987 | Japan ................... 219/69.2 |
| 2185427 | 7/1987 | United Kingdom . |

Primary Examiner—Geoffrey S. Evans
Attorney, Agent, or Firm—Pollock, Vande Sande & Priddy

[57] ABSTRACT

The body (4) of the plug (3) is rebored in the direction of its end wall (6) and the clamp block (7) is drilled by an electric machining process, over a substantial part of the length of the plug. The wall of the plug body (4) is relieved of stress with the aid of a welding torch introduced into the bore made by electric machining, and a gripping tool is introduced into the bore in order to extract from the tube the plug body (4) which has been relieved of stress.

17 Claims, 4 Drawing Sheets

METHOD AND DEVICES FOR THE EXTRACTION OF A CLOSURE PLUG FROM A STEAM GENERATOR TUBE

FIELD OF THE INVENTION

The invention relates to a method for the extraction of a closure plug from a steam generator tube, and also to devices for applying this method.

BACKGROUND OF THE INVENTION

Steam generators in pressurized water nuclear reactors comprise a casing of generally cylindrical shape, inside which a water container is delimited by a tube plate of great thickness, on which the bundle of steam generator tubes is fixed. Each of the tubes of the bundle comprises two parallel rectilinear branches, the end parts of which are fixed inside the tube plate, generally by expansion and by welding.

In a steam generator in operation, the tubes are in contact both with the primary fluid of the nuclear reactor, consisting of pressurized water, and with the secondary fluid consisting of feed water, which is vaporized. Under the operating conditions of the steam generator, the tubes are subject to deterioration of various kinds, particularly to corrosion by the fluids with which they are in contact. Some tubes may become defective in operation and, for example, develop cracks giving rise to leaks, which entail a contamination of the secondary fluid.

During reactor maintenance periods, it is therefore necessary to work on the steam generator and to close off the tubes showing deterioration capable of giving rise to leaks.

Various methods and devices are known which enable a plug to be placed in the end part of a steam generator tube from the water container of the steam generator.

Use is made in particular of closure plugs comprising a tubular body closed at one end by an end wall and provided on its outer surface with outwardly projecting splines assisting the attachment of the plug to the interior of the tube which it is desired to seal off. The plug, whose maximum outside diameter is slightly smaller than the inside diameter of the tube, is introduced through the end of the tube flush with the inlet face of the tube plate.

A clamp block inserted into the body of the plug is pushed or pulled inside the body, which is in position in the tube, in such a manner as to bring about the diametrical expansion of the plug body. The outer surface of the plug, provided with the splines, is thus sealingly applied against the inner surface of the tube, in such a manner as to achieve simultaneously the locking of the plug and the leaktight closure of the tube. The clamp block and the internal bore of the plug generally have corresponding frustoconical shapes permitting the diametrical expansion of the plug body.

This type of plug is generally called a mechanical plug, in contrast to a plug the clamping of which is achieved at least in part by means other than a clamp block movable axially in the bore in the body.

In the case of mechanical plugs, the clamp block remains in place inside the body in order to lock the plug.

In certain cases it may be necessary to remove a plug placed in position in a steam generator tube.

The tubes situated in the central part of the bundle have a curved portion with a small radius of curvature, connecting their two rectilinear branches. The portions having a small radius of curvature, known as small curves, make the tubes in question particularly subject to corrosion because of the relatively great concentration of relatively great of stresses in the curved portion.

As a preventive measure, series of operations have been undertaken for the sealing off of tubes in the central part of the bundle in certain steam generators.

Since then, methods and devices for the effective relief of stresses on the small curves have been developed, and it has become possible to put back into service tubes which had been sealed off as a preventive measure.

In addition, methods are also known for the effective repair of tubes, enabling tubes which had been sealed off to be put back into operation after repair.

It is therefore desirable to have available methods and devices making it possible to effect the extraction of plugs placed in steam generator tubes.

It has, for example, been proposed to lengthen the plug body so as to reduce its outside diameter by contraction, in order to enable the plug to be subsequently extracted. This elongation of the plug body can be effected by thrust applied to the closure end wall of the body, for example with the aid of the clamp block, which in its central part has a tapped hole in which a threaded rod is engaged. The threaded rod is in turn connected to a thrust device, such as a jack.

The disadvantage of this method is that it may lead to a rupture of the tubular plug body, thus entailing additional machining operations, with a consequent increase in irradiation doses for the operators who carry out these machining operations.

The reduction of the thickness of the wall of the plug body by drilling it to a desired diameter has also been considered. However, this drilling cannot extend to a zone close to the end wall of the plug, because the clamp block is driven rotationally through the action of the torque applied by the drill.

Consequently, it is not possible to effect unclamping of the plug by this method, and its extraction is accompanied by damage caused to the inside wall of the tube.

SUMMARY OF THE INVENTION

The invention therefore is a method for the extraction of a closure plug from a steam generator tube, which plug comprises a tubular body closed at one end by an end wall, and a clamp block adapted to be inserted into the body in such a manner as to effect the diametrical expansion of said body inside the tube and its leaktight application against the inside wall of the tube, while the clamp block remains in place in the plug body in the operating position, this method enabling the plug to be extracted without damage to the tube and without any risk of rupture of the plug body inside the tube.

To this end, the plug body is rebored, in the direction of its end wall, at least as far as an expansion zone of the plug where anchoring means are provided, and the clamp block is drilled by electric machining over a substantial part of the length of the plug, the wall of the plug body is relieved of stress with the aid of a welding torch, and a gripping tool is introduced into the bore made by electric machining in order to extract from the tube the plug body which has been relieved of stress.

The invention also relates to devices enabling the different stages of the extraction method of the invention to be carried out.

BRIEF DESCRIPTION OF THE DRAWINGS

In order that the invention may be more clearly understood, a description will now be given, by way of example and with reference to the accompanying drawings, of one embodiment of the method according to the invention and the devices used.

FIG. 5A is a view in direction A—A in FIG. 5.

DESCRIPTION OF THE PREFERRED EMBODIMENTS

Figure 1:
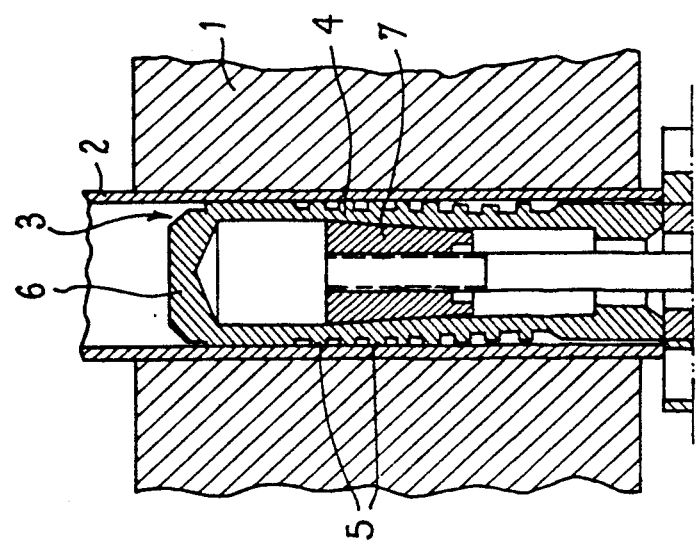
FIG. 1 is a view in axial section of a plug in closure position inside a steam generator tube.

In FIG. 1 the tube plate 1 of a steam generator is shown at the site of a hole which passes through said plate and in which is fastened a tube 2 of the steam generator. A plug 3 has been placed in the tube 2 in order to seal off the latter. The plug 3 comprises a tubular body 4 whose outer surface is provided with outwardly projecting annular splines 5, and a closure end wall 6 disposed at its end. A clamp block 7 is engaged in the interior of the bore in the tubular body 4, which is radially expanded by said clamp block inside the tube 2.

The splines 5 are then held under heavy contact pressure against the inside surface of the tube 2 and effect simultaneously the locking of the plug in the tube and the leaktight closing of the tube.

The locking of the plug inside the tube is effected at one and the same time by the tensions set up in the plug wall on its deformation inside the tube, and by the presence of the clamp block 7.

In order to relieve the tubular wall of the plug 4 of stress over a substantial part of its length, it is necessary to effect intense heating of said wall, for example with the aid of a welding torch, as far as a zone which is close to the end wall 6 of the plug and in which the plug is secured by the splines.

It is quite obvious that the clamp nut and, to a certain extent, the bottom part of the plug wall which has undergone a certain contraction do not permit easy access to the plug wall in its expanded zone inside the tube 2 for the purpose of stress relief.

Figure 2:
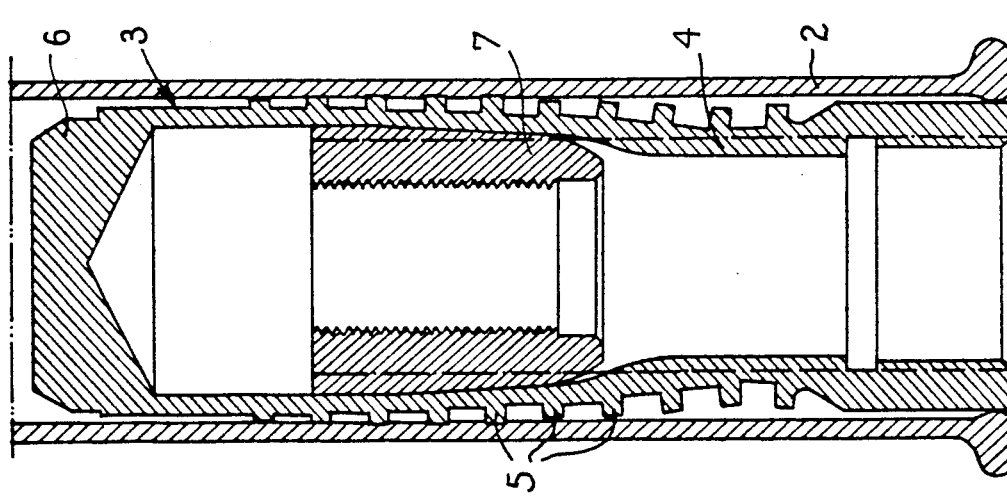
FIG. 2 is a view in section of the plug shown in FIG. 1, showing in dot-and-dash lines the result of the reboring operation.

In FIG. 2 dot-and-dash lines show the parts of the tubular plug body 4 and of the clamp block 7 which are removed by reboring and by drilling, in accordance with the method of the invention.

This preliminary operation makes it possible for access to be gained to the part of the plug which has undergone expansion and in which stress relief is effected before extraction of the plug.

Figure 3:
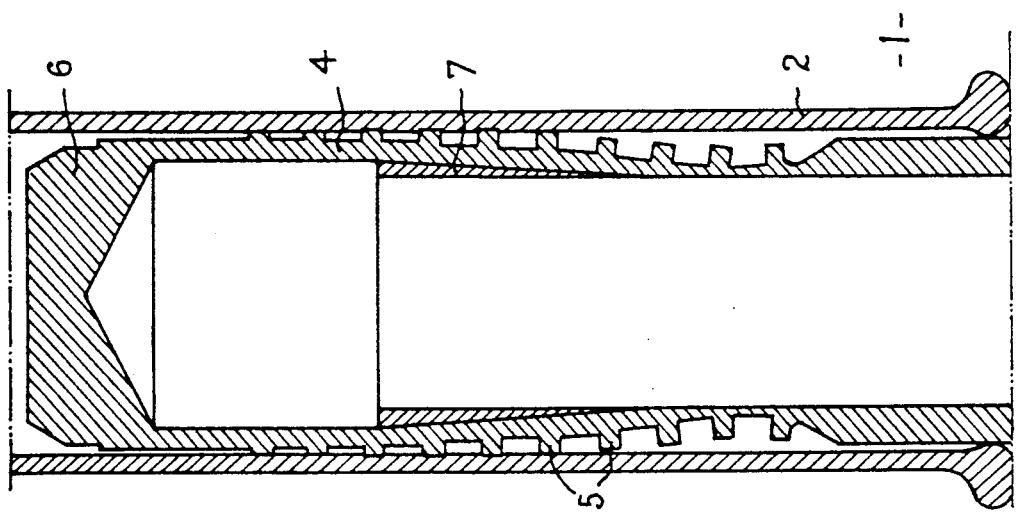
FIG. 3 is a view in section of the plug before the stress relieving phase.

FIG. 3 shows the plug in its state permitting it to be relieved of stress and then to be extracted.

Figure 4:
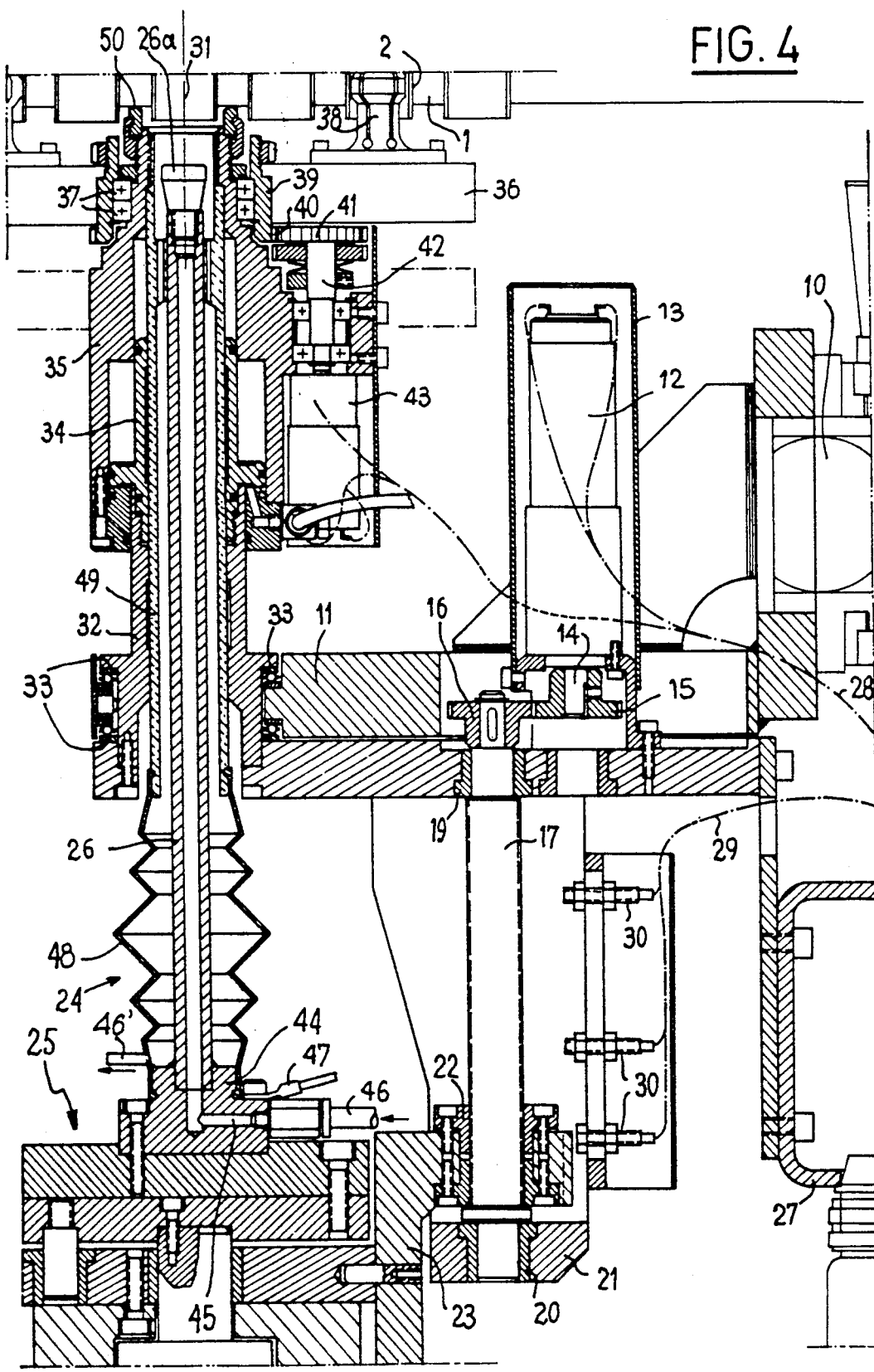
FIG. 4 is a view in elevation, partly in section, of the reboring and electrical discharge drilling device.

FIG. 4 shows a device enabling a closure plug of a steam generator tube to be rebored and drilled by electrical discharge machining.

This device is fixed to the end of an arm 10 enabling it to be moved inside the water container of the steam generator, in such a manner as to position the electrical discharge machining tool in line with the tubes provided with plugs which it is desired to extract.

An arm of this kind moving a tool under the tube plate of a steam generator is well known and will not be described in detail.

A support 11 carrying an electric motor 12 fixed in a casing 13 is fastened to the arm 10. The output shaft 14 of the motor 12 is fastened to a gear 15 driving a second gear 16, which in turn is fastened to the end of a threaded rod 17 mounted for rotation by means of bearings 19 and 20 on the support 11 and on a second support 21, which is likewise fastened to the arm 10 by means of the support 11.

A nut 22 is engaged on the threaded rod 17 and mounted for movement with the bottom part of the electrical discharge machining tool, 24, with the aid of a support 23 on which is fixed the vibrator 25 of the electrical discharge machining tool.

The vibrator 25 consists of a soft iron plate connected to the electrode 26 of the tool 24 and mounted between two electromagnetic suction cups permitting vibration, in the axial direction, of the soft iron plate and of the electrode 26 of the electrical discharge machining tool.

The support 11 and the support 21 which are fastened to the arm 10 also carry an assembly 27 allowing the passage of the supply cables 28 of the motor 12 and of the cables 29 controlling movement in the axial direction of the tool 24, these last-mentioned cables being connected to position detectors 30.

The rotation of the motor 12 enables the electrical discharge machining tool to be moved forward in the axial direction 31 of the tube containing the plug which is to be extracted, this movement being made with the aid of the threaded rod 17 and the nut 22.

The total travel in the axial direction of the movement device makes it possible to position the end of the electrode 26 in the zone of the plug where machining is required, and to make the movement for the purpose of reboring and drilling the plug by electrical discharge machining.

A barrel 32 is mounted at the end of the support 11 by means of bearings and ball thrust bearings 33. A piston 34 is fastened to the top of the barrel 32, and an assembly 35 constituting a cylinder for the piston 34 is mounted around the barrel 32 and the piston 34. This assembly carries a centering plate 36 with the aid of ball bearings 37, in such a manner that the plate 36 is rotatable, relative to the assembly 35, about the longitudinal axis of the electrode 26.

Grippers 38 of known radial expansion type are fixed on the centering plate 36. Each of the grippers 38 comprises a control device permitting its radial expansion after introduction into a steam generator tube 2.

The plate 36 is also provided in its central part, mounted on the bearings 37, with a movable member 39. This movable member 39 is machined on its outer surface to form toothing 40 meshing with a toothed wheel 41 fastened to a shaft 42 connected to the output shaft of a motor 43. It is thus possible to turn the gripper carrier plate 36 through 360° in order to position the grippers 38 in tubes 2 in the bundle, around the tube in which the plug is to be drilled by electrical discharge machining.

By placing in position and clamping grippers 38 in steam generator tubes 2, it is thus possible to achieve perfect alignment of the axis of the electrode 26 with the axis 31 of the tube and of the plug which is to be drilled.

By feeding the jack chamber containing the piston 34 mounted in the chamber delimited in the assembly 35, the assembly 35, the plate 36 and the grippers 38 are lowered to extract them from the tube.

The electrode 26 comprises a tubular body of great length, connected at its bottom part to a member 44 which is fixed on the vibrator 25 and in which the tubular member is brought into communication with a water injection duct 45 connected to a supply pipe 46. The water is recovered by the pipe 46' connected to the bellows 48. The member 44 also enables the electrode to receive its electricity supply by way of a contact 47 connected to a conductor of large cross-section.

The top part 26a of the electrode 26, constituting the actual machining part of the electrode, is provided with channels inclined relative to the axis of the electrode, for the passage of the water. The diameter of this top part 26a corresponds to the diameter of the bore which is to be formed in the plug.

The bellows 48 is connected to the one hand to the contact member 44, and to a tubular insulating member 49 surrounding the tubular part of the electrode 26.

For the utilization of the device shown in FIG. 4, for the purpose of forming the bore and of drilling a plug, such as that shown in FIG. 2, the tool is placed in the position shown in FIG. 4 with the aid of the arm 10, in such a manner that the grippers 38 on the centring plate 36 are engaged in tubes 2 next to the tube in which the plug is to be drilled. A stop 50 fastened to the top of the assembly 35 then comes into contact with the inlet face of the tube plate 1, in such a a manner as to ensure the leaktightness of the tool.

The diametrical expansion of the grippers 38 is then effected inside the tubes 2, thus making it possible to achieve perfect centering of the electrode relative to the plug which is to be drilled, and to bring into alignment the axis of the electrode and the axis of the tube corresponding to the axis of the plug which is to be drilled.

The electrode is brought into the machining position and moved forward during machining by means of the motor 12 driving the threaded rod 17 and the nut 22. The vibrator is put into operation and water is supplied to the machining zone. The electrode is supplied with electric current through the contact 47.

During the machining the particles of metal of small dimensions detached from the plug through the action of the electrical discharge machining are recovered in the water inside the bellows 48 by way of the pipe 46', this water being filtered and cooled on leaving the pipe 46'.

It is thus possible to effect the reboring of the contracted portion of the plug body and the drilling of the clamp block of this plug, without applying any torque capable of rotating the clamp block inside the plug body.

The drilling by electrical discharge machining is continued until the electrode comes close to the end wall of the plug.

In certain cases it is possible also to drill through the end wall of the plug, which makes it possible to introduce an extraction tool through the end wall of the plug, as will be explained hereinbelow.

The perfect centering of the electrical discharge machining electrode makes it possible to rebore the contracted portion of the plug body 4, as can be seen in FIG. 2, without drilling or cutting the wall of this contracted portion.

Figure 5:
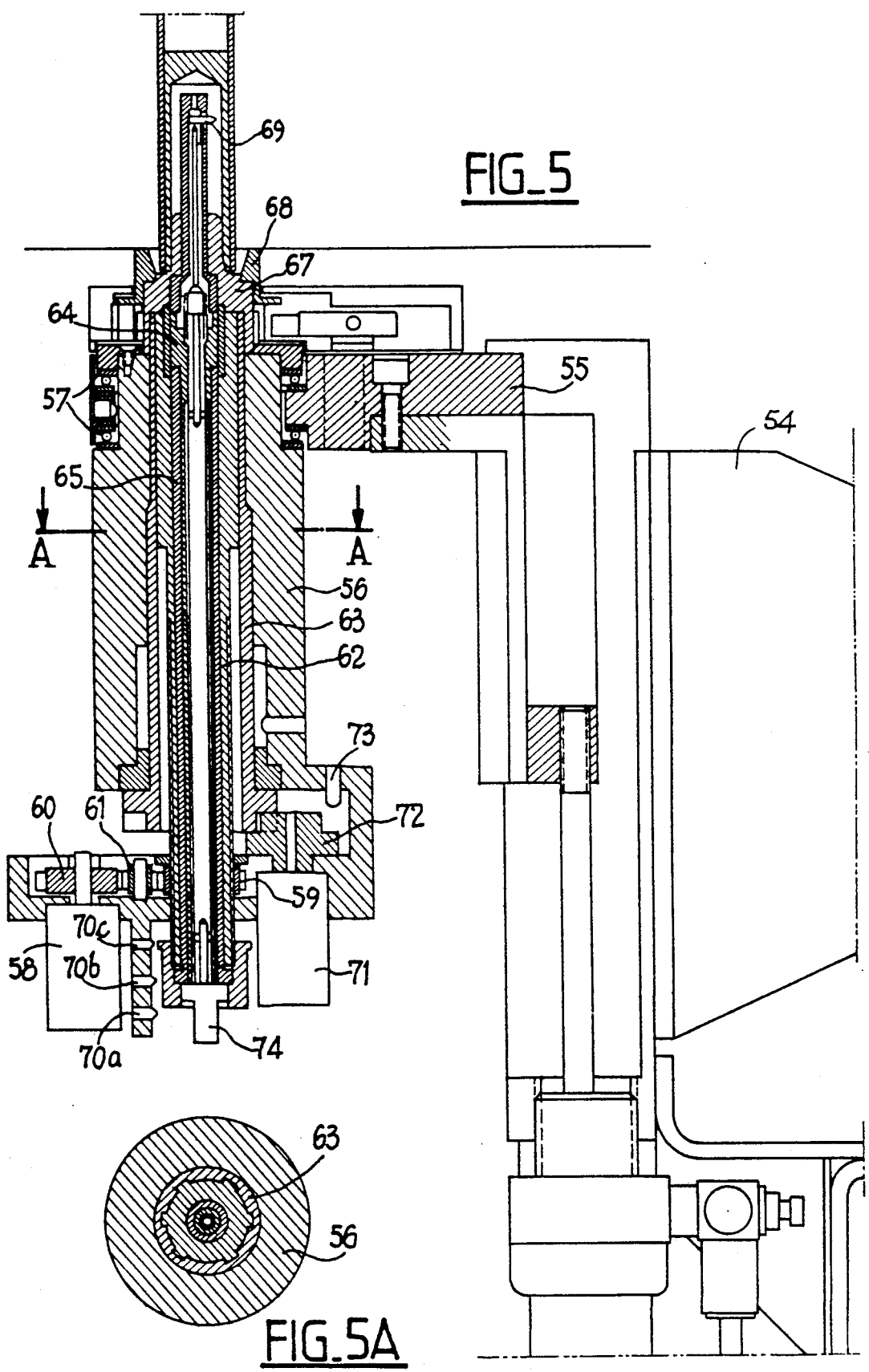
FIG. 5 is a view in elevation, partly in section, of the stress relieving device.

In FIG. 5 shows a device making it possible to effect the stress relief of the plug wall in contact with the tube of the steam generator, by using a welding torch, after drilling and reboring of the plug as explained above.

FIG. 5 is a basic diagram showing the stress relief device in the form of a welding torch consisting of a rod made of a metal which is a good conductor, such as brass, and carrying at its end a tungsten electrode 69 directed radially. The torch is carried by a device 54 enabling it to be moved upwards or downwards in the vertical direction in order to move the torch towards or away from the plug. A device of this kind, which can be placed inside the water container of a steam generator for the introduction of a tool into the interior of a steam generator tube, is known in the art and will not be described in detail.

The device 54 carries a vertical movement means 55, on which a frame 56 is mounted floating with the aid of an assembly 57 consisting of bearings and ball thrust bearings. The frame 56 carries a translation motor 58 which drives a nut 59 with the aid of pinions 60 and 61. A threaded shaft 62 is in engagement with the nut 59 for its axial displacement inside a grooved shaft 63 fastened to the frame 56.

The welding torch 64 is fixed inside the threaded shaft 62, with the interposition of a sheath 65 of insulating material, such as stumatite. The assembly comprising the members 62, 64 and 65 is adapted to make axial translatory movements.

The torch 64 is centered in the axis of the plug 3 by a centering means 67, on which is fixed a stop 68 bearing against the tube plate.

The electrode 69 of the torch 64 is fixed at its top end, which enters into plug 3, in the operating position.

Three detectors 70a, 70b and 70c stop the torch at the end of its movement. The detector 70a corresponds to an electrode storage position, in which the electrode is protected during the centering of the machine in the plug 3.

The detector 70b corresponds to the end of the travel of the electrode in the low position, after stress relief.

The detector 70c corresponds to the end of the travel of the electrode in the high position, before stress relief.

The orientation motor 71 drives the grooved shaft 63 with the aid of the pinion 72. A detector 73 enables the rotation of the motor 71 to be stopped when the grooved shaft 63 has made a rotation of 60°.

The grooved shaft 63 rotationally drives the threaded shaft 62 and the stress relief torch assembly 64, 65.

The supply of argon through the interior of the welding torch is effected by a nozzle 74. The welding torch 64 is provided at its end with openings for the passage of argon. Electric current is likewise supplied through the nozzle 74.

The plug wall is fused along a generatrix during the downward movement of the electrode brought about by the translation motor 58.

The metal of the plug body wall is fused along six generatrices, whereby the plug is relieved of stress.

It is also possible to effect fusion along helicoidal zones by combining an axial translatory displacement movement of the electrode and a continuous rotary movement.

Figure 6:
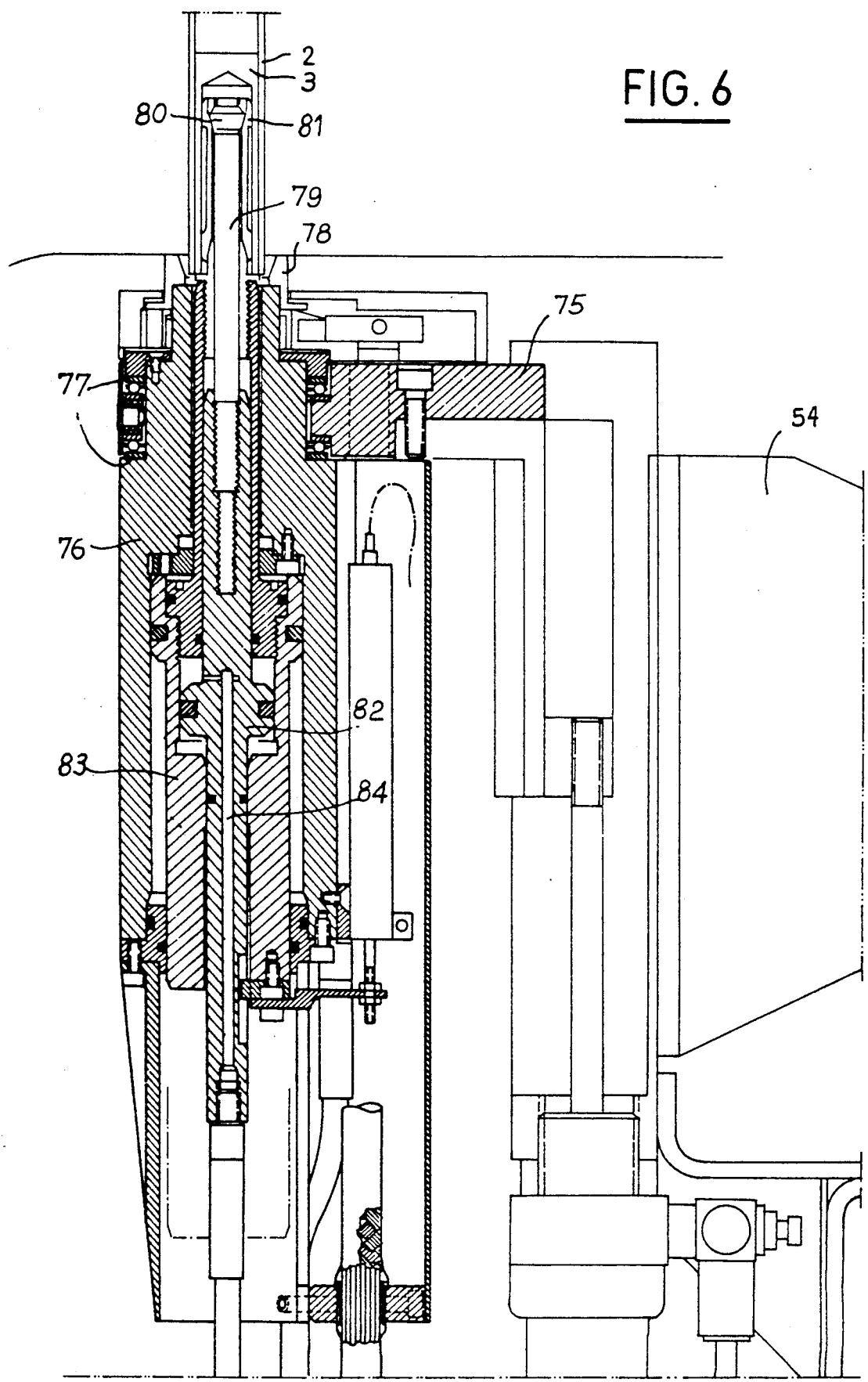
FIG. 6 is a front elevation, partly in section, of the extraction device.

When the plug body wall has been relieved of stress, it can be extracted with the aid of a device such as that illustrated in FIG. 6. This device comprises a means of upward or downward axial displacement, which may be the device 54 shown in FIG. 5.

The tool is connected to the device 54 by means of a support 75, on which a sleeve 76 is mounted for rotation by means of ball bearing 77. At its top end, the sleeve is fastened to a support stop 78 which comes into contact with the bottom face of the tube plate when the tool is in extraction position, as shown in FIG. 6. The tool comprises a rod 79, the top part 80 of which constitutes an olive-shaped member engaged in a radially expansible tubular jacket 81 and adapted to be introduced into the plug 3 after reboring and stress relief of said plug.

The rod 79 is fastened to a piston 82 mounted inside a cylinder machined in a body 83 fixed inside the sleeve 76.

The hydraulic jack constituted by the piston 82 and the cylinder in which the piston moves is supplied with hydraulic fluid through an axially directed duct 84.

When the jack is supplied with hydraulic fluid, the piston 82 and the rod 79 are displaced in the downward direction, so that the olive-shaped member 80 moves apart the radially expansible parts of the jacket 81, which is thus locked inside the plug 3.

After the tool has been expanded with the aid of the piston 82 of a first jack, the plug is extracted by means of the piston of the annular jack 83.

The plug 3 can easily be extracted from the tube because the plug wall has been relieved of stress and no longer exerts radial stresses on the inside wall of the tube.

The plug can thus be extracted without damaging the inside surface of the tube 2.

It is also possible to effect the extraction by using a rod having an oblong-shaped end, which is introduced into an opening of corresponding shape machined by electrical discharge machining in the end wall of the plug.

By turning the rod after it has passed through the opening in the end wall of the plug, the extraction can be effected by pulling the rod with the aid of an appropriate means, such as a jack.

In all cases, the extraction can be achieved easily, since the plug has been relieved of stress over a substantial part of its length, particularly in its part which had been expanded inside the tube.

The method and the devices according to the invention may be applied to any type of closure plug fixed in a steam generator tube.

We claim:

1. Method for the extraction of a closure plug (3) from a steam generator tube (2), said plug comprising a tubular plug body (4) closed at one end by an end wall (6), and a clamp block (7) adapted to be inserted into said plug body (4) in such a manner as to effect diametrical expansion of said plug body (4) inside said tube (2) and its leaktight application against an inner wall of said tube, while said clamp block (7) remains in place in said plug body (4) in operating position, said method comprising the steps of (a) re-boring said plug body (4), in a direction of said end wall, at least as far as an expansion zone of said plug where anchoring means are provided, and drilling said clamp block (7) by electric machining over a substantial part of a length of said clamp block;

(b) relieving a wall of said plug body (4) of stress with the aid of a welding torch introduced into a bore re-bored in said plug body by electric machining; and (c) introducing a gripping tool into said bore in order to extract from said tube said plug body relieved of stress.

2. Method of extraction according to claim 1, wherein said clamp block is drilled over its entire axial length and an electric machining electrode is moved forward as far as a point close to said end wall (6) of said plug (3).

3. Method of extraction according to claim 1, including the steps of drilling an end wall (6) of said plug (3) to form a hole of oblong shape, introducing a gripping tool, which has a corresponding shape and is fixed to an end of a rod, into said hole of oblong shape, turning said gripping tool through a predetermined angle, and extracting said plug by pulling the rod of said tool.

4. Method of extraction according to claim 1, wherein stress relief is effected by partial fusion of said wall of said body (4) of the plug (3) along a plurality of generatrices of said wall.

5. Method of extraction according to claim 1, wherein stress relief is effected by partial fusion of said wall of said body (4) of said plug (3) along a helicoidal line whose axis is the axis of said plug.

6. Extraction device for extracting a closure plug (3) from a steam generator tube (2), said plug comprising a tubular body (4) closed at one end by an end wall (6), and a clamp block (7) adapted to be inserted into said body (4) in such a manner as to effect diametrical expansion of said body inside said tube and its leaktight application against an inside wall of said tube, while said clamp block remains in place in said plug body in operating position, said device comprising a tool effecting reboring and drilling by electric machining, fixed on an arm (10) and comprising an electric machining electrode (26, 26a) connected to said arm (10) in such a manner that said electrode can be placed in alignment with an axis of said plug (3) to be extracted, a device (12, 15, 16, 17, 22) for axial displacement of said electrode (26, 26a), and an assembly (36, 38) for centering of said electrode relative to said plug to be extracted, said assembly comprising diametrically expansible fastening means (38) adapted to be engaged in steam generator tubes (2) next to a tube in which said plug (3) to be extracted is situated.

7. Extraction device according to claim 6, wherein said electrode (26, 26a) is connected at a bottom part of said electrode to a vibrator (25), by means of which said electrode is connected to the device (12, 15, 16, 17, 22) effecting displacement in axial direction.

8. Extraction device according to claim 7, comprising an axially directed tubular sleeve (32) fastened to said arm (10) inside which said electrode (26, 26a) is mounted for movement in axial direction, said centering assembly (36, 38) being carried by an assembly (35) mounted for sliding in said axial direction on said sleeve (32) and on a piston (34) fastened to said sleeve (32) and mounted inside a chamber formed in said assembly (35) in such a manner as to constitute a jack for axial displacement of said centering device (36, 38).

9. Extraction device according to claim 8, wherein said electrode (26) is connected at an end thereof opposite to its working end (26a) to an electric contact member (44) fastened to said vibrator (25) and provided with a duct (45) supplying water to said electrode (26, 26a) having an elongate body of tubular shape.

10. Device according to claim 9, wherein said electrode (26, 26a) is disposed inside an electrically and thermally insulating sleeve (49) fixed in the tubular sleeve (32) over a part of the length of said electrode and connected to said contact member (44) by means of a bellows (48).

11. Extraction device according to claim 6, wherein the device for the axial displacement of said electrode (26, 26a) consists of a motor (12) rotationally driving an axially directed threaded rod (17) on which a nut (22) fastened to said vibrator (25) is engaged.

12. Extraction device according to claim 6, wherein said centering assembly (36, 38) comprises a plate (36) carrying at least two radial expansion fastening devices (38) mounted for rotation about the axis of said electrode (26, 26a) on said assembly (35).

13. Extraction device according to claim 6, comprising a stress relief means composed of a torch (62) carrying a welding electrode (69), means (58, 59) for displacement of said torch (64) in the axial direction of said tubes, means (71, 72) for displacement of said torch by rotation about its axis, and a device (54) for moving said torch towards and away from a tube (2) provided with a plug (3).

14. Extraction device according to claim 13, wherein the rotary displacement device (71, 72) effects an angular displacement of predetermined amplitude of said welding electrode.

15. Extraction device according to claim 6, wherein the stress relief means comprises a tubular member (65) of insulating material disposed around said torch (64).

16. Extraction device according to claim 6, comprising a plug gripping tool carried by a means (54) for displacement in the axial direction of the steam generator tubes and comprising a radially expansible jacket (81) having a diameter smaller than an inside diameter of said plug body, and a rod (79) fixed to a piston (82), an olive-shaped member (80) for radial expansion of said jacket (81), said piston (82) being mounted inside a chamber formed in a body fastened to the axial displacement device (54) in such a manner as to constitute a jack actuating said rod (79) and said olive-shaped member (80).

17. Extraction device according to claim 16, comprising a gripping tool which is connected to said internal piston (82) of an annular jack for the purpose of its expansion and to the external piston (83) of said annular jack for the purpose of extracting the plug.

* * * * *